(12) United States Patent
Cyr

(10) Patent No.: US 8,851,793 B2
(45) Date of Patent: Oct. 7, 2014

(54) WATER WAVE BREAKER ASSEMBLY

(75) Inventors: Jean-Pierre Cyr, Levis (CA); Annie Cyr, legal representative, Donnacona (CA)

(73) Assignee: 9223-0523 Quebec Inc., Levis, Quebec ( * ) Notice: Subject to any disclaimer, the term of this patent is extended or adjusted under 35 U.S.C. 154(b) by 152 days.

(21) Appl. No.: 13/641,421

(22) PCT Filed: Apr. 15, 2011

(86) PCT No.: PCT/CA2011/050199
§ 371 (c)(1),
(2), (4) Date: Dec. 21, 2012

(87) PCT Pub. No.: WO2011/127606
PCT Pub. Date: Oct. 20, 2011

(65) Prior Publication Data
US 2013/0236248 A1     Sep. 12, 2013

(30) Foreign Application Priority Data
Apr. 15, 2010   (GB) .................................. 1006247.9

(51) Int. Cl.
*E02B 3/04* (2006.01)
*E02B 3/06* (2006.01)

(52) U.S. Cl.
CPC .. *E02B 3/04* (2013.01); *E02B 3/062* (2013.01)
USPC .......................................................... 405/27

(58) Field of Classification Search
CPC .............. E02B 3/04; E02B 3/06; E02B 3/062
USPC ..................................................... 405/26–28
See application file for complete search history.

(56) References Cited

U.S. PATENT DOCUMENTS

| 3,426,537 | A | * | 2/1969 | Chenoweth et al. | 405/27 |
| 3,473,335 | A | * | 10/1969 | Launer | 405/27 |
| 3,886,602 | A | * | 6/1975 | Stanwood | 4/497 |
| 3,952,521 | A | | 4/1976 | Potter | |
| 3,969,901 | A | | 7/1976 | Matsudaira et al. | |
| 3,991,576 | A | * | 11/1976 | Tazaki et al. | 405/21 |
| 4,136,994 | A | * | 1/1979 | Fuller | 405/27 |
| 4,712,944 | A | * | 12/1987 | Rose | 405/26 |
| 5,823,710 | A | * | 10/1998 | Dooley | 405/29 |

FOREIGN PATENT DOCUMENTS

| GB | 2204080 | 2/1988 |
| JP | 54096089 | 7/1979 |

OTHER PUBLICATIONS

International Search Report, PCT/CA2011/050199, Jul. 12, 2011, 3 Pages.

* cited by examiner

*Primary Examiner* — Tara M. Pinnock
(74) *Attorney, Agent, or Firm* — BCF LLP

(57) ABSTRACT

A water wave breaker assembly comprising a buoyant wave breaker element including a plurality of longitudinally extending members spaced-apart from one another and defining an open cage structure; and an anchor assembly connectable to the buoyant wave breaker element and which can allow rotation of the buoyant wave breaker element when floating on a body of water. The buoyant wave breaker element can include a plurality of transversal arms extending through the open cage structure and outwardly past the longitudinally extending members. The water wave breaker assembly can be provided as a kit.

20 Claims, 6 Drawing Sheets

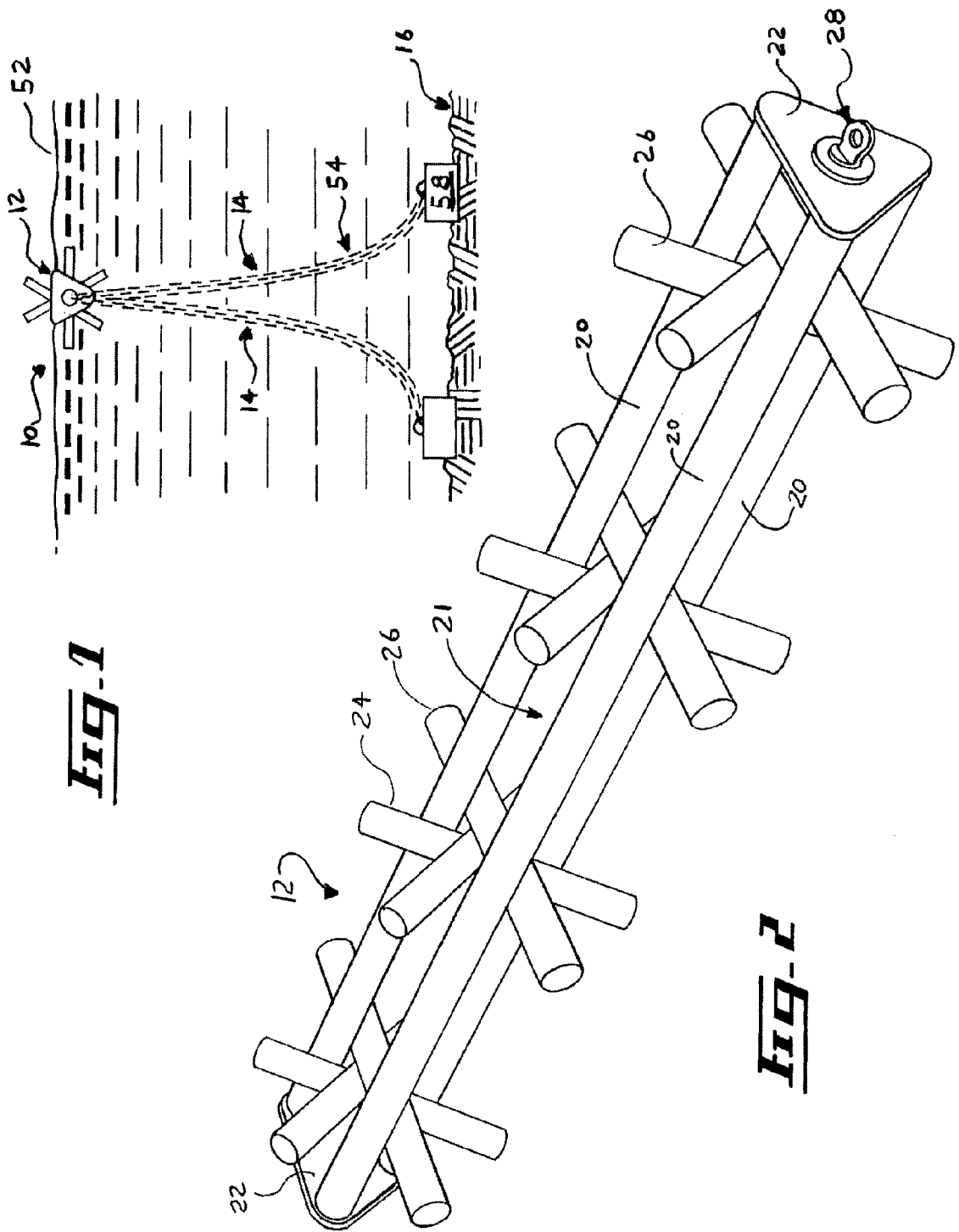

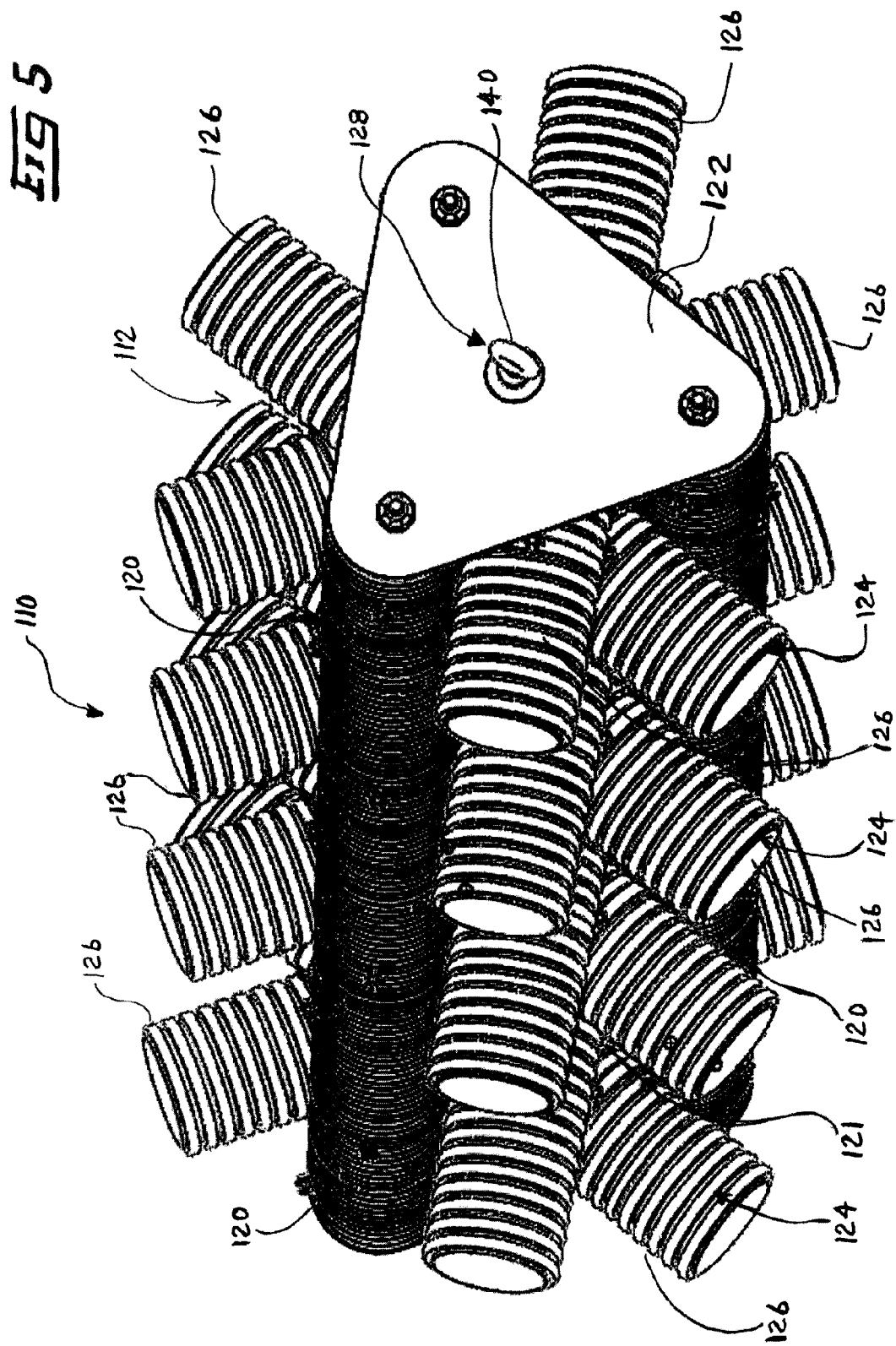

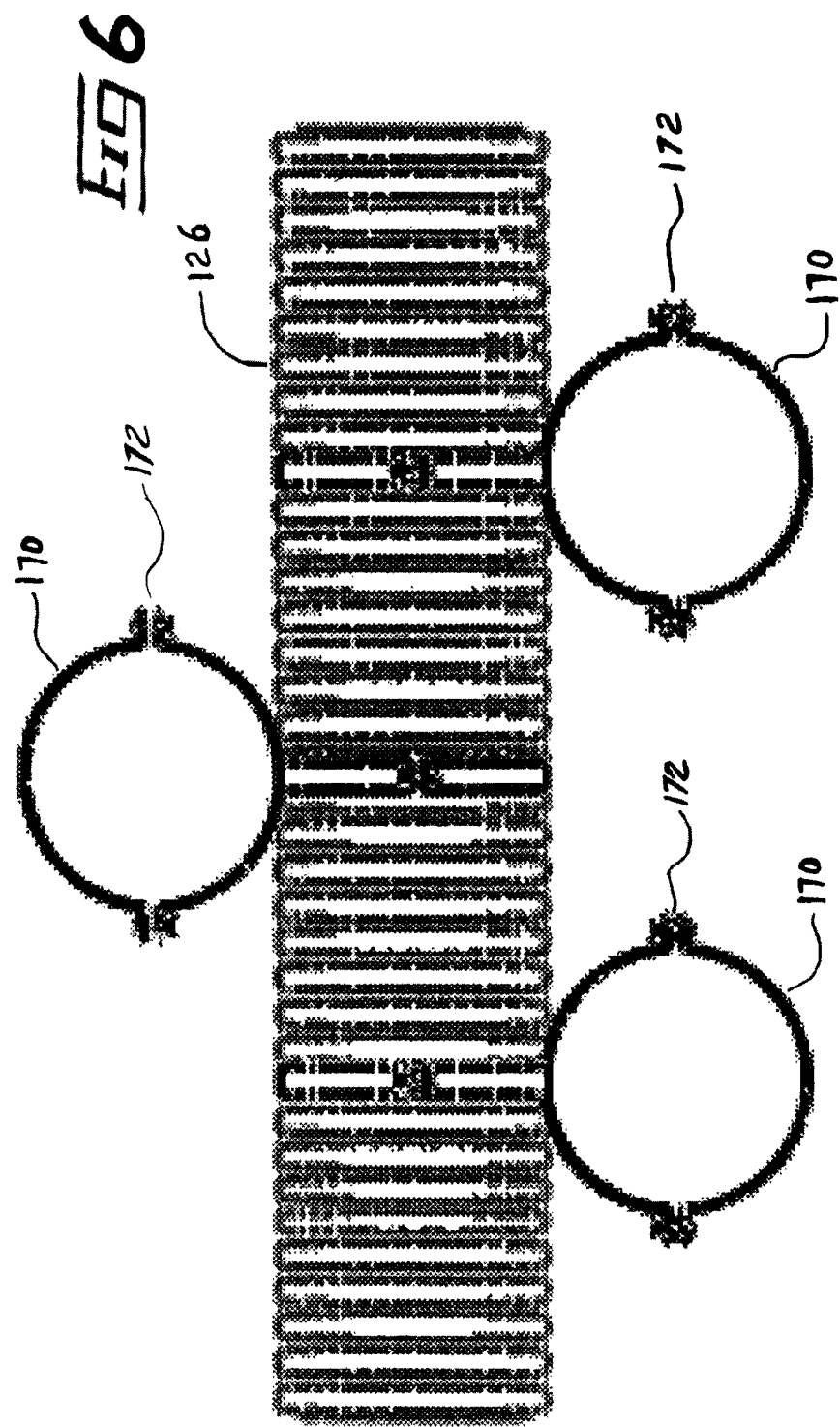

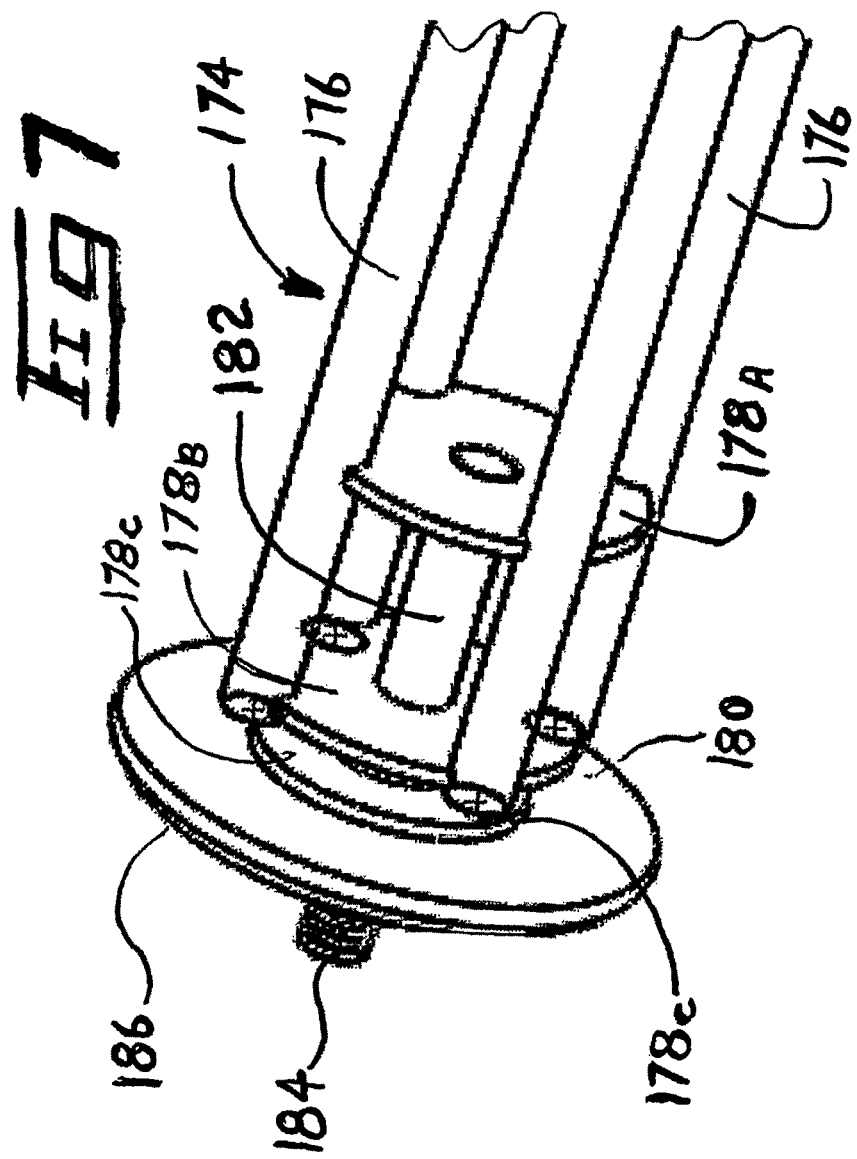

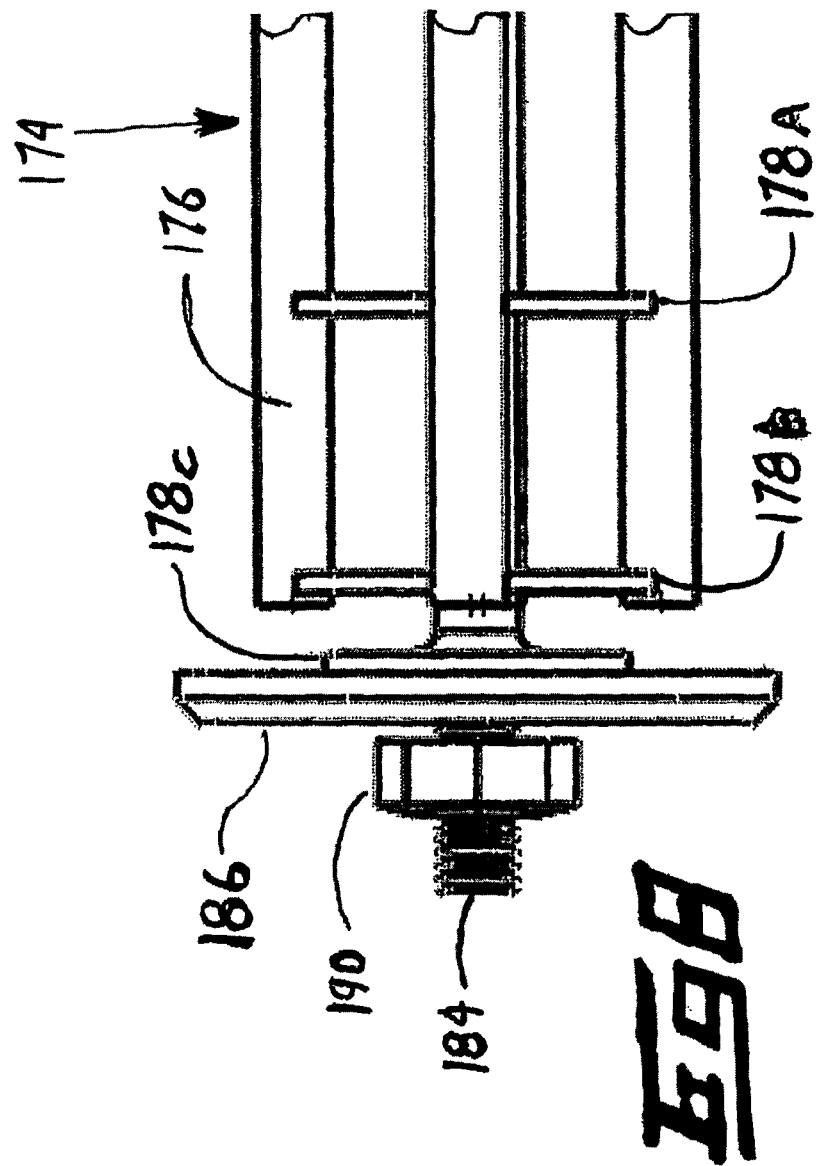

WATER WAVE BREAKER ASSEMBLY

CROSS-REFERENCE TO RELATED APPLICATIONS

This application claims priority of patent application GB1006247.9 filed on Apr. 15, 2010. the specification of which is hereby incorporated by reference. This application is a national phase entry of PCT patent application Ser. No. PCT/CA2011/050199 filed on Apr. 15, 2011 (now pending), designating the United States of America.

TECHNICAL FIELD OF THE INVENTION

The technical field relates to water wave breaker assemblies and, more particularly, to a wave breaker assembly for efficiently absorbing and suppressing water waves on a body of water and to kit for manufacturing same.

BACKGROUND

Water wave breaker assemblies are known in the art and are generally used for absorbing and suppressing the propagation of water waves on a body of water. Wave breakers are particularly useful for protecting selected portions of shorelines along lakes, rivers and oceans against the damaging erosion effects caused by the repetitive destructive force of incoming water waves. Thus, by protecting shorelines from the eroding effects of incoming waves, beaches and shorelines can replenish in sediments, vegetation and marine life shoreline structures. Furthermore, shoreline structures are also preserved.

Water wave breakers are disposed to interfere with and breakup oncoming waves by dissipating their energies and forces. Noticeable examples of the prior art are U.S. Pat. No. 6,568,878 B2, to Woodall et Al. (2003), U.S. Pat. Nos. US2002/0132539A1, to Smith (2002), U.S. Pat. No. 5,700,108, to Bishop et Al. (1997), U.S. Pat. No. 5,558,459, to Odenbach et Al. (1996), and U.S. Pat. No. 5,304,005, to Loeffer-Lenz (1994).

There is a need for water wave breakers that offer shoreline protection from wave motion. The water wave breaker should efficiently absorb and suppress the propagation of waves; do not require relatively elaborated and complex installation procedures for securing the latter along a shoreline; be designed for installation in shallow and relative deep waters; and should be relatively easy and inexpensive to manufacture.

BRIEF SUMMARY OF THE INVENTION

It is therefore an aim of the present invention to address the above mentioned issues.

According to a general aspect, there is provided a water wave breaker assembly comprising: a buoyant wave breaker element including a plurality of longitudinally extending members spaced-apart from one another and defining an open cage structure; and an anchor assembly connectable to the buoyant wave breaker element and allowing rotation of the buoyant wave breaker element when floating on a body of water.

In an embodiment, the water wave breaker assembly further comprises a plurality of transversal arms extending through the open cage structure and outwardly past the longitudinally extending members in a substantially perpendicular configuration with respect to the longitudinally extending members. It can further comprise at least one structural member connected to the longitudinally extending members and configurating the longitudinally extending members in the spaced apart configuration to define the open cage structure through which a liquid can flow. It can further comprise at least one ballast element couplable with at least one of the longitudinally extending members, the transversal arms, and the at least one structural member. It can further comprise at least one buoyancy element couplable to at least one of the longitudinally extending members, the transversal arms, and the at least one structural member. In an embodiment, the at least one structural member comprises at least two structural members and wherein two of the structural members connect respective distal ends of the longitudinally extending members. In an embodiment, it can further comprise at least two rotatable coupler units, each one of the rotatable coupler units being connected to a respective one of the structural members connected to the distal ends of the longitudinally extending members and being connected to the anchor assembly. Each one of the structural members can be connected to the distal ends of the longitudinally extending members have an aperture defined therein substantially aligned with a central longitudinal axis of the buoyant wave breaker element, the rotatable coupler units being rotatably inserted in a respective one of the apertures. At least one of the structural members can connect the longitudinally extending members between the distal ends. In an embodiment, the at least one structural member comprises a structural plate extending substantially perpendicularly to the longitudinally extending members.

In an embodiment, the buoyant wave breaker element comprises at least one ballast element and at least one buoyancy element and the buoyant wave breaker element is configured to rest substantially horizontally in the body of water and wherein the longitudinally extending members are at least partially immerged below a water surface of the body of water.

In an embodiment, the buoyant wave breaker element comprises an odd number of longitudinally extending members.

In an embodiment, the longitudinally extending members comprise tubular members extending substantially parallel to one another along the buoyant wave breaker element.

In an embodiment, the longitudinally extending members are configured to define the open cage structure with a substantially triangular cross-section.

In an embodiment, the buoyant wave breaker element comprises at least two sets of the transversal arms and wherein each one of the sets comprises at least two of the transversal arms. The transversal arms of the sets can have a criss-crossing center coinciding substantially with a central longitudinal axis of the buoyant wave breaker element.

In an embodiment, the transversal arms comprise tubular members with a movable ballast inserted therein.

In an embodiment, the transversal arms have a length which is at least twice the distance between two of the longitudinally extending members spaced-apart from one another.

In an embodiment, the anchor assembly comprises at least one flexible anchor link having a first end connected to the buoyant wave breaker element and allowing rotation thereof and a second end attached to a stationary anchor.

In an embodiment, the anchor assembly comprises at least two flexible anchor links, each one of the flexible anchor links having a first end connected to a respective distal end of the buoyant wave breaker element and allowing rotation thereof and a second end attached to at least one stationary anchor in a configuration substantially preventing pivoting movements of the buoyant wave breaker element relatively to a direction of incoming waves. Each one of the first ends can be connected to a respective rotatable coupler unit connected to the buoyant wave breaker element.

In an embodiment, at least one of the transversal arms and the longitudinally extending members can comprise an outer shell including high density polyethylene.

According to another general aspect, there is provided a buoyant wave breaker element comprising: a plurality of longitudinally extending members spaced-apart from one another and defining an open cage structure; and a plurality of transversal arms extending through the open cage structure and outwardly past the longitudinally extending members.

In an embodiment, the transversal arms extend in a substantially perpendicular configuration with respect to the longitudinally extending members.

The buoyant wave breaker element can further comprise at least one structural member connected to the longitudinally extending members and configurating the longitudinally extending members in the spaced apart configuration to define the open cage structure through which a liquid can flow. It can further comprise at least one ballast element couplable with at least one of the longitudinally extending members, the transversal arms, and the at least one structural member. It can further comprise at least one buoyancy element couplable to at least one of the longitudinally extending members, the transversal arms, and the at least one structural member.

In an embodiment, the at least one structural member comprises at least two structural members and wherein two of the structural members connect respective distal ends of the longitudinally extending members. The buoyant wave breaker element can further comprise at least two rotatable coupler units, each one of the rotatable coupler units being connected to a respective one of the structural members connected to the distal ends of the longitudinally extending members and being connectable to an anchor assembly. In an embodiment, each one of the structural members connected to the distal ends of the longitudinally extending members has an aperture defined therein substantially aligned with a central longitudinal axis of the buoyant wave breaker element, the rotatable coupler units being rotatably inserted in a respective one of the apertures. The at least one of the structural members can connect the longitudinally extending members between the distal ends. In an embodiment, at least one of the structural members comprises a structural plate extending substantially perpendicularly to the longitudinally extending members.

In an embodiment, the buoyant wave breaker element comprises at least one ballast element and at least one buoyancy element and the buoyant wave breaker element is configured to rest substantially horizontally in a body of water and wherein the longitudinally extending members are at least partially immerged below a water surface of the body of water.

In an embodiment, the buoyant wave breaker element comprises an odd number of longitudinally extending members.

In an embodiment, the longitudinally extending members comprise tubular members extending substantially parallel to one another along the buoyant wave breaker element.

In an embodiment, the longitudinally extending members are configured to define the open cage structure with a substantially triangular cross-section.

In an embodiment, the buoyant wave breaker element comprises at least two sets of the transversal arms and wherein each one of the sets comprises at least two of the transversal arms. The transversal arms of the sets can have a criss-crossing center coinciding substantially with a central longitudinal axis of the buoyant wave breaker element.

In an embodiment, the transversal arms comprise tubular members with a movable ballast inserted therein.

In an embodiment, the transversal arms have a length which is at least twice the distance between two of the longitudinally extending members spaced-apart from one another.

In an embodiment, at least one of transversal arms and the longitudinally extending members comprises an outer shell including high density polyethylene.

According to still another general aspect, there is provided a wave breaker assembly kit comprising: a plurality of longitudinally extending members; at least one structural member connectable to the longitudinally extending members and configurating the longitudinally extending members in a spaced apart configuration and defining therewith an open cage structure through which a liquid can flow; and a plurality of transversal arms insertable in the open cage structure in a non-parallel orientation with respect to the longitudinally extending members and extending outwardly past the longitudinally extending members when inserted in the open cage structure.

The wave breaker assembly kit can further comprise at least one ballast element couplable with at least one of the longitudinally extending members, the transversal arms, and the at least one structural member. The wave breaker assembly kit can further comprise at least one buoyancy element couplable to at least one of the longitudinally extending members, the transversal arms, and the at least one structural member. In an embodiment, the transversal arms extend in a substantially perpendicular configuration with respect to the longitudinally extending members when inserted in the open cage structure.

In an embodiment, the at least one structural member comprises at least two structural members and wherein two of the structural members are connectable to respective distal ends of the longitudinally extending members.

The wave breaker assembly kit can further comprise at least two rotatable coupler units, each one of the rotatable coupler units being securable to a respective one of the structural members securable to the distal ends of the longitudinally extending members and being connectable to an anchor assembly. Each one of the structural members securable to the distal ends of the longitudinally extending members can have an aperture defined therein and the rotatable coupler units are rotatably insertable in a respective one of the apertures. At least one of the structural members can be connectable to the longitudinally extending members between the distal ends.

At least one of the structural members can comprise a structural plate extending substantially perpendicularly to the longitudinally extending members when secured together.

In an embodiment, the kit comprises an odd number of longitudinally extending members.

In an embodiment, the transversal arms comprise tubular members with a movable ballast inserted therein.

In an embodiment, the transversal arms have a length which is at least twice the distance between two of the longitudinally extending members spaced-apart from one another.

In an embodiment, at least one of the transversal arms and the longitudinally extending members comprises an outer shell including high density polyethylene.

The wave breaker assembly kit can further comprise an anchor assembly connectable to the at least one structural member and allowing rotation of an assembly of the longitudinally extending members, the transversal arms, and the at least one structural member when floating on a body of water. In an embodiment, the anchor assembly further comprises at least one flexible anchor link having a first end connectable to the at least one structural member and allowing rotation thereof and a second end connectable to a stationary anchor.

According to still a further general aspect, there is provided a wave breaker assembly kit comprising: a plurality of longitudinally extending members; at least one structural member connectable to the longitudinally extending members and configurating the longitudinally extending members in a spaced apart configuration and defining therewith a the buoyant wave breaker element with an open cage structure through which a liquid can flow when connected together; at least one rotatable coupler unit securable to the at least one structural member; and an anchor assembly connectable to the buoyant wave breaker element through the at least one rotatable coupler unit and allowing rotation of the buoyant wave breaker element when floating on a body of water.

The wave breaker assembly kit can further comprise a plurality of transversal arms insertable in the open cage structure in a non-parallel orientation with respect to the longitudinally extending members and extending outwardly past the longitudinally extending members when inserted in the open cage structure.

The wave breaker assembly kit can further comprise at least one ballast element couplable with at least one of the longitudinally extending members, the transversal arms, and the at least one structural member.

The wave breaker assembly kit can further comprise at least one buoyancy element couplable to at least one of the longitudinally extending members, the transversal arms, and the at least one structural member.

In an embodiment, the at least one structural member comprises at least two structural members and wherein two of the structural members are connectable respective distal ends of the longitudinally extending members.

The wave breaker assembly kit can further comprise at least two rotatable coupler units, each one of the rotatable coupler units being securable to a respective one of the structural members securable to the distal ends of the longitudinally extending members and being connectable to the anchor assembly. In an embodiment, each one of the structural members connectable to the distal ends of the longitudinally extending members has an aperture defined therein and the rotatable coupler units are rotatably insertable in a respective one of the apertures.

In an embodiment, at least one of the structural members is connectable to the longitudinally extending members between the distal ends.

In an embodiment, at least one of the structural members comprises a structural plate.

In an embodiment, the kit comprises an odd number of longitudinally extending members.

In an embodiment, the longitudinally extending members are configurable to define the open cage structure with a substantially triangular cross-section.

In an embodiment, the kit comprises at least two sets of the transversal arms and wherein each one of the sets comprises at least two transversal arms.

In an embodiment, the transversal arms comprise a movable ballast inserted therein.

In an embodiment, the transversal arms have a length which is at least twice the distance between two of the longitudinally extending members spaced-apart from one another when assembled into the wave breaker element.

In an embodiment, the anchor assembly comprises at least one flexible anchor link having a first end connectable to the buoyant wave breaker element and allowing rotation thereof and a second end securable to a stationary anchor. The anchor assembly can comprise at least two flexible anchor links, each one of the flexible anchor links having a first end connectable to a respective distal end of the buoyant wave breaker element and allowing rotation thereof and a second end securable to at least one stationary anchor. Each one of the first ends can be connectable to a respective rotatable coupler unit connectable to the buoyant wave breaker element.

In an embodiment, at least one of the transversal arms and the longitudinally extending members comprises an outer shell including high density polyethylene.

BRIEF DESCRIPTION OF THE DRAWINGS

FIG. 1 is a schematic environmental view of a water wave breaker assembly in accordance with an embodiment;

FIG. 2 is a perspective view of a buoyant wave breaker element of the water wave breaker assembly shown in FIG. 1 in accordance with an embodiment;

FIG. 5 is a perspective view of a buoyant wave breaker element in accordance with another embodiment wherein longitudinally extending members and transversal members are corrugated tubing;

FIG. 6 is a side elevation view, fragmented and enlarged, of one of the transversal members shown in FIG. 5 having interconnected ring members to engage adjacent longitudinally extending members;

FIG. 7 is a side elevation view, fragmented, of an internal framework of one of the longitudinally extending members shown in FIG. 5 in accordance with an embodiment; and FIG. 8 is a top plan view, fragmented, of the internal framework shown in FIG. 7.

It will be noted that throughout the appended drawings, like features are identified by like reference numerals.

DETAILED DESCRIPTION

Figure 3:
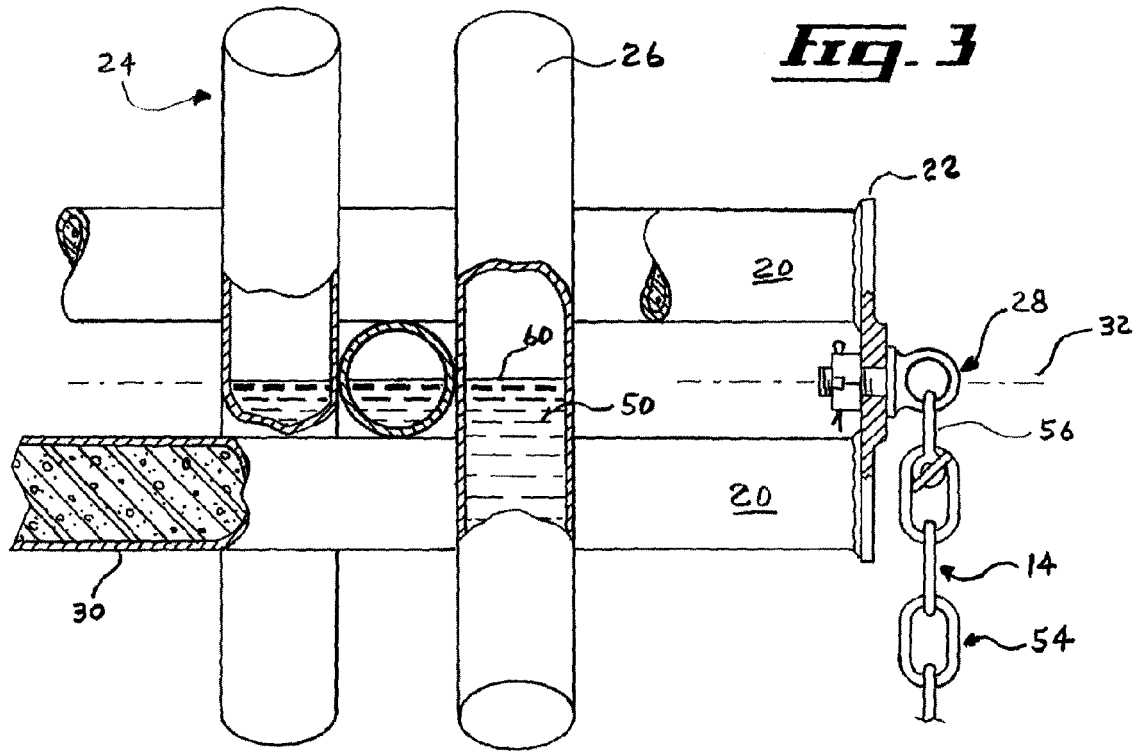
FIG. 3 is a side elevation view, fragmented, of a distal end of the buoyant wave breaker element shown in FIG. 2.

Referring now to the drawings and, more particularly, referring to FIG. 1, there is shown a water wave breaker assembly 10 in accordance with an embodiment. The water wave breaker assembly 10 includes a buoyant wave breaker element 12 and an anchoring assembly 14 for anchoring the wave breaker element 12, for example, to the bottom 16 of a body of water such as and without being limitative an ocean, a sea, a lake, and a river. The water wave breaker assembly 10 is designed for absorbing and suppressing the propagation of waves on the body of water.

Now referring to FIG. 2, an embodiment of the wave breaker element 12 will be described in more details. The wave breaker element 12 includes a plurality of longitudinally extending members 20. In the embodiment shown, the longitudinally extending members 20 are tubular members with a circular cross-section mounted in a spaced-apart and substantially parallel relationship to one another. They define an open cage-like structure with an inner spacing 21 through which water can flow.

In the embodiment shown, the wave breaker element 12 includes three (3) longitudinally extending members 20. However, one skilled in the art will appreciate that the wave breaker element 12 can include more than three (3) longitudinally extending members 20. In a non-limitative embodiment, the wave breaker element 12 includes an odd number of longitudinally extending members 20. In the embodiment shown, the longitudinally extending members 20 of the wave breaker element 12 are configured in a substantially equilateral triangular configuration, i.e. the open cage structure has a substantially equilateral triangular cross section. However, one skilled in the art will appreciate that the longitudinally extending members 20 of the wave breaker element 12 can be configured in any suitable polygonal configuration, i.e. the open cage structure can have any suitable polygonal cross section.

Similarly, in the embodiment shown, the longitudinally extending members 20 of the wave breaker element 12 have a substantially circular cross-section. However, one skilled in the art will appreciate that the longitudinally extending members 20 of the wave breaker element 12 can have any suitable cross-sectional shape.

In the embodiment shown, the longitudinally extending members 20 of the wave breaker element 12 extend in a substantially parallel and spaced-apart relationship. However, one skilled in the art will appreciate that they can extend in a non parallel relationship wherein the resulting wave breaker element 12 has a smaller cross-section at a first longitudinal position and a larger cross-section at a second longitudinal position, spaced apart from the first longitudinal position. Furthermore, a longitudinally extending member 20 can include two or more distinct longitudinally extending sub-members positioned in a juxtaposed relationship but spaced-apart from the other longitudinally extending members 20 to define the open cage structure through which water can flow.

In a non-limitative embodiment, the longitudinally extending members 20 can include a plurality of longitudinally extending member sections juxtaposed to one another in a longitudinally adjacent and consecutive configuration and connected together to define continuous longitudinally extending members 20.

In still another embodiment, the wave breaker element 12 can include a plurality of adjacent open cage sections defined by longitudinally extending members 20 and connected together through a connector, which can be centrally mounted. In an embodiment, the connector is connectable to the anchor assembly and allows rotation of the wave breaker element 12 on a body of water.

The wave breaker element 12 further includes structural members 22 configured for maintaining the longitudinally extending members 20 in a substantially spaced apart relationship and defining the open cage structure. In the embodiment shown, the structural members 22 include two structural plates, each one being mounted to respective spaced-apart distal ends of the longitudinally extending members 20. The structural plates 22 are mounted transversally to the longitudinally extending members 20. The structural plates 22 have a triangular shape which substantially corresponds to the triangular cross-section of the open cage structure. One skilled in the art will appreciate that the shape of the structural members 22 can vary in accordance with the shape of the wave breaker element 12. Furthermore, one skilled in the art will appreciate that other equivalent structural members 22 than plate members can be used to assemble the longitudinally extending members 20 in the open cage configuration.

The structural members 22 are configured to maintain the longitudinally extending members 20 in a substantially spaced apart relationship to define the cross-sectional shape of the wave breaker element 12. For instance, in the embodiment shown, the structural members 22 have a substantially triangular shape and one of the longitudinally extending members 20 is associated to each corner of the structural members 22. Furthermore, the number and the position of the structural plates along the wave breaker element 12 can vary. For instance and without being limitative, in an alternative embodiment (not shown), structural members can be provided between the two spaced-apart distal ends of the longitudinally extending members 20 to further strengthen the structural integrity of the wave breaker element 12. The intermediate structural members 22 can be equidistant or not along the wave breaker element 12.

One skilled in the art will appreciate that the shape and the configuration of the structural members 22 can vary.

The wave breaker element 12 further includes a plurality of sets 24 of transversal members or arms 26 extending through the open cage structure defined by the longitudinally extending members 20. In the embodiment shown, the transversal arms 26 extend in a substantially radial configuration relatively to the open cage structure. The transversal arms 26 of the sets 24 meet at a central point which substantially corresponds to the central longitudinal axis 32 of the wave breaker element 12. They extend in-between the longitudinally extending members 20 with a substantially perpendicular orientation. In the embodiment shown, the cross-sectional diameter of the transversal arms 26 is small enough to be inserted transversally through the assembly of longitudinally extending members 20.

Each set 24 includes three (3) transversal arms 26 and the sets 24 are spaced-apart from one another along the elongated wave breaker element 12. The transversal arms 26 intersect through the longitudinally extending members 20 in a star-like configuration and substantially along the longitudinal axis 32 of the wave breaker element 12. In an alternative embodiment, one skilled in the art will appreciate that each set 24 includes at least one and preferably a plurality of transversal arms 26 that are intersecting through the longitudinally extending members 20.

Each one of transversal arms 26 is a relatively short, in comparison with the longitudinally extending members 20, and hollow tubular member that is hermetically sealed. In the embodiment shown, the transversal arms 26 protrude outwardly from the open cage structure and the longitudinally extending members 20. Thus, the transversal arms 26 have a length that is at least slightly greater than the greatest distance separating two longitudinally extending members 20. For example, in a non-limitative embodiment, the transversal arms 26 have a length that is roughly equivalent to double the greatest distance separating two longitudinally extending members 20. Other lengths of transversal arms 26 are also possible. Furthermore, the plurality of transversal arms 26 in one wave breaker element 12 may have different relative lengths. In an alternative embodiment (not shown), at least some of the transversal arms can remain substantially in the open cage structure, i.e. they do not protrude outwardly therefrom and extend outwardly past the longitudinally extending members 20.

One skilled in the art will appreciate that the number of sets 24 and the number of transversal arms 26 in each set 24 can vary. Furthermore, in the embodiment shown, the sets 24 of transversal arms 26 are substantially equidistantly spaced-apart from one another along the wave breaker element 12. However, in an alternative embodiment (not shown), the distance between consecutive sets 24 can vary along the buoyant wave breaker element 12.

Each set 24 can include one or more transversal arms 26. The sets 24 can be spaced-apart or not along the wave breaker element 12.

It is appreciated that the number and configuration of the transversal arms 26 in one set 24 can vary. For instance and without being limitative, the number and the configuration of the transversal arms 26 in one set 24 can vary in accordance with the number and the configuration of longitudinally extending members 20 defining the open cage structure.

In the embodiment shown, the transversal arms 26 extend through the open cage structure and cross the central longitudinal axis 32 of the wave breaker element 12, i.e. the crisscrossing center of the transversal arms 26 substantially coincides with the central longitudinal axis 32 of the wave breaker element 12. However, in an alternative embodiment (not shown), the transversal arms 26 can extend through the open cage structure without crossing the central longitudinal axis 32.

In the embodiment shown, the ends of the transversal arm 26 are not connected to the longitudinally extending members 20 but extend outwardly past the longitudinally extending members 20. They extend outwardly of the open cage structure in the spacing defined between two adjacent and consecutive longitudinally extending members 20.

The wave breaker element 12 further includes a pair of rotatable coupler units 28 mounted to the structural members 22 for rotatably connecting the wave breaker element 12 to the anchoring assembly 14. The rotatable coupler units 28 allow rotation of the wave breaker element 12 around its central longitudinal axis 32 when floating on a body of water. An embodiment of the rotatable coupler units 28 will be described in more details below. In the embodiment shown, the rotatable coupler units 28 are spaced apart from another and aligned with a central longitudinal axis 32 of the wave breaker element 12. As mentioned above, the longitudinally extending members 20 are mounted in a spaced apart relation about the central longitudinal axis 32.

The wave breaker element 12 is buoyant. In an embodiment, the combined buoyancy and weight distribution of the various elements that compose the wave breaker element 12 is adjusted in a manner such that the wave breaker element 12 rests substantially horizontally in water, with only a top longitudinal portion of one or more longitudinally extending members 20 that are substantially at level with surface 52, as shown in FIG. 1. In an embodiment, the upper longitudinally extending member(s) 20 are substantially aligned with the surface 52. In an embodiment, no longitudinally extending members 20 extend entirely above the water surface 52. The wave breaker element 12 can have one or more longitudinally extending members 20 aligned with the surface 52 depending on the configuration of the longitudinally extending members 20. Thus, the central longitudinal axis 32 of the water breaker element 12 is positioned slightly submerged under the water surface, and only portions of some of the transversal arms 26 are extending above the water surface 52. In other words, the buoyant wave breaker element 12 is configured to rest in a position wherein all the longitudinally extending members 20 are at least partially immerged below the water surface 52, i.e. only one or more upper one of the longitudinally extending members 20 partially extend above the water surface 52.

In the embodiment shown, the longitudinally extending members 20 are buoyant. As mentioned above, the longitudinally extending members 20 are elongated tubular member having a circular cross-section and at least partially filled with a buoyant material 30 such as, for example, an injected foam material, gases such as air and the like. In an alternative and non-limitative embodiment, the longitudinally extending members 20 can be hollow and hermetically sealed tubular members.

In the embodiment shown, the closed volume of each one of the transversal arms 26 contains a ballast material and, more particularly, a fluid ballast 50 such as an anti-freeze liquid if the wave breaker 10 is installed in any environment including tempered regions where sub-zero temperatures may prevail. Furthermore, it is to be understood that depending on the local temperature range in which the wave breaker 10 is operating, other types of fluid ballast 50 may be used such as, for example, water or sea salt water, or a more viscous fluid such as a bio-degradable oil.

One skilled in the art will appreciate that the fluid ballast 50 can be replaced by any displaceable or movable ballast material such as and without being limitative granular/particular material including sands, rock particles, rust-proof metal pellets, and the like, bags of granular/particular material, etc.

In an embodiment, the volume of movable ballast 50 occupies roughly half the available volume within each one of the transversal arms 26. Thus, whatever is the rotational angle of the wave breaker element 12; the level 60 of movable ballast 50 substantially coincides with the central longitudinal axis 32, as shown in FIG. 3. However, one skilled in the art will appreciate that the volume of the movable ballast 50 can vary in accordance with, amongst others, the configuration of the wave breaker element 12, the density of the movable ballast element, and the density and quantity of buoyant element.

In an alternative embodiment, the longitudinally extending members 20 can include ballast components, which can be movable ballast components, and the transversal arms 26 can be buoyant. For instance, the transversal arms 26 can be at least partially filled with a buoyant material. In another alternative embodiment, at least one of the longitudinally extending members 20 and the transversal arms 26 can include a combination of ballast elements and buoyant elements.

Figure 4:
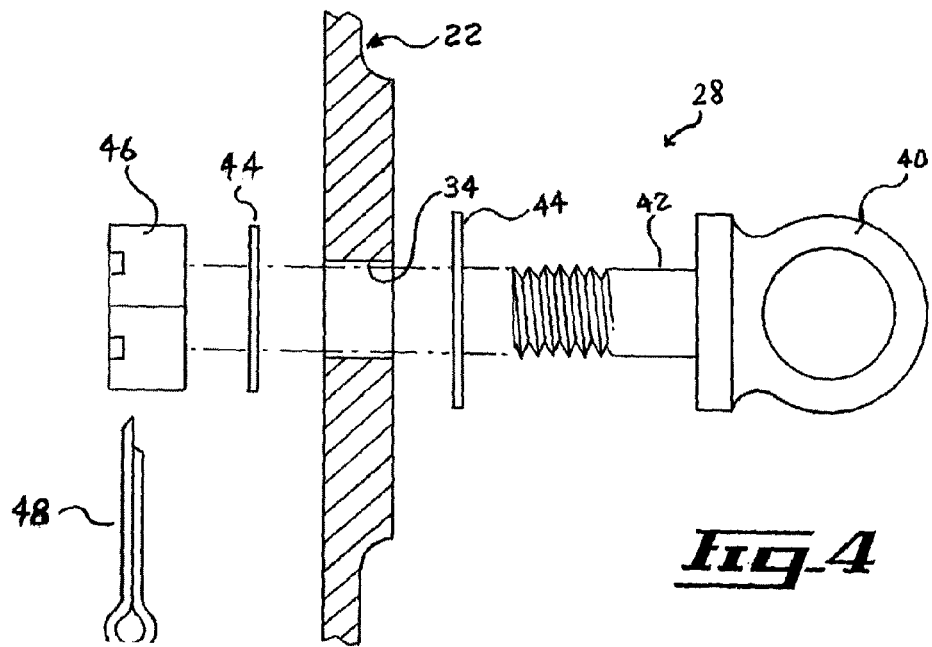
FIG. 4 is a side elevation view, exploded, of a rotatable coupler unit of the buoyant wave breaker element shown in FIG. 2 in accordance with an embodiment.

Now referring more particularly to FIG. 4, an embodiment of the rotatable coupler units 28 will be described in more detail. More particularly, the end structural members 22, joining the distal ends of the longitudinally extending members 20, are provided with centrally disposed rotatable coupler support 34 such as through hole or aperture that is axially aligned with the central longitudinal axis 32 of the wave breaker element 12. The rotatable coupler support 34 is suitably sized and configured for freely rotatably engage the rotatable coupler unit 28. In the embodiment shown, the rotatable coupler unit 28 includes a conventional fastener combination such as closed hook 40 provided with a threaded screw end 42, a pair of washers 44 and a lockable bolt 46 with lock pin 48.

As mentioned above, the wave breaker element 12 is provided with a pair of oppositely oriented and freely rotatable coupler units 28 that are substantially axially aligned with the central longitudinal axis 32. Thus, the wave breaker element 12 is rotatable around its central longitudinal axis 32.

One skilled in the art will appreciate that the rotatable coupler units 28 can differ from the above described embodiment. To allow rotation of the wave breaker element 12, the anchoring assembly 14 is connected to the rotatable coupler units 28.

Referring back to FIG. 1, an embodiment of the anchoring assembly 14 will be described in more details. The anchoring assembly 14 includes one or more stationary anchor 58 connected to wave breaker element 12 and, more particularly, to the rotatable coupler units 28. In the embodiment shown, the anchoring assembly 14 includes two spaced-apart anchors 58, each one being connected to a respective one of the coupler units 28 through flexible anchor links 54. Thus, the anchoring assembly 14 is anchoring each distal end of the wave breaker element 12 to the bottom 16 of a body water.

More particularly, each one of the flexible anchor links 54 has a first end attached to a respective one of the coupler units 28, which are rotatably mounted to the ends of the wave breaker element 12, and a second and opposite end attached to a stationary anchor 58.

The flexible anchor links 54 are of a suitable length, strength, and weight to allow the wave breaker element 12 to freely rest in water in a substantially unrestrained state, even in high tide condition. They can include for instance and without being limitative a chain link or any other equivalent flexible link. They further include releasable attachment fasteners 56 or the like mounted to their first end engageable with the coupler units 28. As mentioned above, the second and opposite end of the flexible anchor link 54 is attached to the stationary anchor 58 provided at the bottom 16 of the body of water. The stationary element or structure defining the anchor 58 is preferably sufficient to securely anchor the wave breaker element 12 during extreme conditions of wind and wave sizes.

As exemplified in FIG. 1, the stationary anchor 58 may be represented by a suitably sized anchoring weight that is made of, for example, concrete or metal, and deposited at the bottom 16 of the body of water, or may be represented by anchoring stake driven thereinto.

In an alternative embodiment (not shown), the anchoring assembly 14 can be represented by a pair of booms, which can be disposed spaced-apart from one another, of suitable length (not shown), having a distal end pivotably attached to the rotatable coupler units 28 provided at the distal ends of the wave breaker element 12. The opposite distal ends of the elongated booms can be pivotably anchored or otherwise attached to a stationary element or structure along the shore of the body of water, such as, for example, a deck structure or the like.

One skilled in the art will appreciate that the anchoring assembly 14 can include one or more stationary anchors 58. In the anchoring assembly 14, the stationary anchors 58 can be configured in a spaced-apart or in an adjoining configuration. The anchoring assembly 14 should prevent pivotal movement of the wave breaker element 12 relatively to the direction of the incoming waves. The wave breaker element 12 should be oriented substantially perpendicularly to the direction of the incoming waves, i.e. substantially parallel to the incoming waves. Furthermore, in the embodiment shown, the flexible anchor links 54 of the anchoring assembly 14 are connected to the ends of the wave breaker element 12. However, in an alternative embodiment (not shown), they can be connected to any other position along the wave breaker element 12.

The anchoring assembly 14 can include one or more links 54, which can be flexible or not, connecting the anchors 58 to the wave breaker element 12.

In an embodiment, the anchoring assembly 14 including the anchor links 54 and the anchors 58 is connected to the wave breaker element 12 in a manner such that it maintains its orientation relatively to the incoming waves and allows rotation of the wave breaker element 12.

The wave breaker element 12 described above is suitably proportionally sized and configured relative to the maximum wave heights and widths that are prevailing in a given body of water. For example, the overall cross-sectional diameter of the wave breaker element 12, including the transversal arms 26, may be about two feet (or about 60 centimeters) for protecting the shores of a relatively small lake or river against the waves created by high wind conditions and proportionally small boats. The overall cross-sectional diameter of the wave breaker element 12 may be about thirty feet (or about nine meters), or more, for protecting a sea shore.

The tubular members including the longitudinally extending members 20 and transversal arms 26, as well as the structural members 22, can be made of a suitably rigid and rust-proof material such as, for example, aluminium, a surface-treated steel, or a suitably rigid polymer, high density polyethylene (HDPE), Teflon®, PVC, ABS, or a combination of these. Considerations in the choice of material should be made for wave breaker 10 used in tempered and sub-zero temperature regions.

The longitudinally extending members 20, the transversal arms 26, and the structural members 22 can be assembled using any conventional means such as, for example, mechanical fasteners, soldering processes, suitable adhesives including epoxy, suitable thermal-bonding processes, and the like. Alternatively, the longitudinally extending members 20, the transversal arms 26, and the structural members 22 may be integrally formed as a single piece element using a conventional injection molding process.

In a manner readily apparent to one skilled in the art of wave breaker systems, at least one wave breaker 10 as described above can be positioned at a suitable distance from the shoreline to be protected against the destructive effects of incoming water waves. The wave breaker element 12 of the wave breaker assembly 10 is positioned and suitably anchored transversally relative to the general direction of the incoming waves.

Additional wave breaker assemblies 10 can be positioned in a substantially serial, or end to end configuration, and either in a substantially straight, arched or sinusoidal configuration, so as to form a shield barrier against waves along a substantially extended portion of a shoreline. Alternatively, a plurality of wave breaker configurations, as described above, can be positioned in series or in parallel at a suitable distance along the shoreline to be protected.

One or more wave breaker elements 12 can be anchored at suitable distance, for example, in a substantially longitudinal configuration along a shoreline that requires to be protected against the damaging effect of water waves.

In operation, the substantially polygonal cross-section, such as and without being limitative the triangular cross-section, formed by the spaced apart, buoyant longitudinally extending members 20, combined with the transversal arms 26 with a movable ballast 50 provides substantial stability to the wave breaker element 12 while resting in a body of water. This buoyant stability is substantially held for up to a predetermined level of water turbulence created by transversally oriented water waves, i.e. substantially perpendicularly to the wave breaker element 12. Above this pre-determined level of transversally applied water turbulence, the wave breaker element 12 may rotate at least one third of a full rotation (or a 60 degree rotation) on itself due, in part, by the force of relatively tall waves applied transversally against the portions of transversal arms 26 extending above the water surface 52.

Thus, proportionally small and medium wave sizes, relative to the cross-sectional height of the wave breaker element 12, are substantially absorbed and suppressed by the open cage structure defined by the longitudinally extending members 20 and transversal arms 26 of the submerged portion of the wave breaker 10. Proportionally taller waves are substantially absorbed and suppressed by the submerged portion of the wave breaker 10, as described above, as well as the portion of the transversal arms 26 extending above the water level 52.

In some instances, relatively tall waves may force the wave breaker element 12 to rotate on itself, thus raising above the water surface a plurality previously submerged portions of transversal arms 26 that are radially extending towards the incoming waves, which in turn, further absorb and suppress the extending tail, or back portion of the incoming wave.

The presence of a suitable amount of movable ballast 50 within the transversal arms 26 provides a convenient means to induce a custom level of hysteresis effect to the rotational action of the wave breaker element 10, in order to provide an optimized level of absorption and suppression of water waves prevailing on a given body water.

Referring to FIG. 5, there is shown an alternative embodiment of the wave breaker assembly 10 wherein the features are numbered with reference numerals in the 100 series which correspond to the reference numerals of the previous embodiment. As the wave breaker assembly 10, the wave breaker assembly 110 includes three longitudinally extending members 120 with a plurality of sets 124 of transversal arms 126. The transversal arms 126 extend outwardly past the longitudinally extending members 120. The longitudinally extending members 120 and the transversal members 126 have an outer shell made of corrugated high density polyethylene (HDPE) pipes. The transversal arms 126 include a movable ballast component while the longitudinal extending members 120 are buoyant members.

As shown in FIGS. 5 and 6, the longitudinally extending members 120 and the transversal arms 126 are connected to one another through metallic ring members 170 welded to one another in a substantially perpendicular orientation (only one of the transversal arms 126 is shown in FIG. 6). Each one of the ring members 170 surrounds one of the longitudinally extending members 120 and the transversal arms 126 and is attached to another one of the ring members 170 which surrounds the other one of the longitudinally extending members 120 and the transversal arms 126. In the embodiment shown, the ring members 170 include two semi-circular members securable to one another through mechanical fasteners 172. In the embodiment shown, the ring members 170 have an adjustable diameter.

Referring now to FIGS. 7 and 8, there is shown an embodiment of an internal framework 174 of the longitudinally extending members 120. In the embodiment shown, the framework 174 includes four (4) spaced-apart and peripheral rod members 176 connected to one another through spaced-apart circular plate members 178a, 178b, 178c. The end sections 180 of the framework 174 includes a central rod 182 with a threaded end 184 which corresponds to the central longitudinal axis of the longitudinally extending members 120. The threaded end 184 of the central rod 182 is engageable with an end cap 186 of the longitudinally extending members 120 with the end plate 178c abutting the end cap 186 and nut 190 securing the assembly together.

The framework 174 rigidifies the longitudinally extending members 120 made of HDPE.

One skilled in the art will appreciate that the configuration and structure of the internal framework 174 can vary from the above described and illustrated embodiment. Furthermore, in an alternative embodiment, the longitudinally extending members 120 can be free of internal framework. In an embodiment, the transversal arms 126 can also include an internal framework which can be similar or different from the internal framework 174 of the longitudinally extending members 120.

Thus, there is provided wave breakers 10, 110 having a relatively simply assembly, and which can substantially efficiently absorb and suppress waves propagating on a body of water.

The wave breaker assemblies 10, 110 described above substantially efficiently absorb and suppress the propagation of waves on a body of water. The movable ballast within the transversal members and/or the longitudinally extending members provide a convenient means to customarily adjust the hysteresis effect of the rotational action of the wave breaker element for a given condition of wave sizes. It is relatively easy to install along a shoreline, it can be suitably sized and configured for installation in shallow waters; and it is relatively simple and economical to produce.

The water wave breakers described above can be so constructed and arranged in its component parts that it may be assembled as a kit or in kit form.

Several alternative embodiments and examples have been described and illustrated herein. The embodiments of the invention described above are intended to be exemplary only. A person of ordinary skill in the art would appreciate the features of the individual embodiments, and the possible combinations and variations of the components. A person of ordinary skill in the art would further appreciate that any of the embodiments could be provided in any combination with the other embodiments disclosed herein. It is understood that the invention may be embodied in other specific forms without departing from the spirit or central characteristics thereof. The present examples and embodiments, therefore, are to be considered in all respects as illustrative and not restrictive, and the invention is not to be limited to the details given herein. Accordingly, while the specific embodiments have been illustrated and described, numerous modifications come to mind without significantly departing from the spirit of the invention. The scope of the invention is therefore intended to be limited solely by the scope of the appended claims.

The invention claimed is:

1. A water wave breaker assembly comprising:
    a buoyant wave breaker element including a plurality of longitudinally extending members spaced-apart from one another and defining an open cage structure; and
    an anchor assembly connectable to the buoyant wave breaker element and allowing rotation of the buoyant wave breaker element when floating on a body of water;
    wherein the buoyant wave breaker element comprises at least one ballast element and at least one buoyancy element and wherein the buoyant wave breaker element is configured to rest substantially horizontally in the body of water when the longitudinally extending members are at least partially immerged below a water surface of the body of water.

2. A water wave breaker assembly as claimed in claim 1, further comprising a plurality of transversal arms extending through the open cage structure and outwardly past the longitudinally extending members in a substantially perpendicular configuration with respect to the longitudinally extending members.

3. A water wave breaker assembly as claimed in claim 2, wherein the buoyant wave breaker element comprises at least two sets of the transversal arms each one of the sets comprises at least two of the transversal arms, and the transversal arms of the sets have a criss-crossing center coinciding substantially with a central longitudinal axis of the buoyant wave breaker element.

4. A water wave breaker assembly as claimed in claim 2, wherein the transversal arms have a length which is at least twice the distance between two of the longitudinally extending members spaced-apart from one another.

5. A water wave breaker assembly as claimed in claim 1, further comprising:
    at least two structural members connected to distal ends of the longitudinally extending members and configurating the longitudinally extending members in a spaced apart configuration to define the open cage structure through which a liquid can flow; and
    at least two rotatable coupler units, each one of the rotatable coupler units being connected to a respective one of the at least two structural members and being connected to the anchor assembly;

wherein each one of the at least two structural members has an aperture defined therein substantially aligned with a central longitudinal axis of the buoyant wave breaker element, the rotatable coupler units being rotatably inserted in a respective one of the apertures.

6. A water wave breaker assembly as claimed in claim 5, further wherein:
the at least one ballast element is couplable with at least one of the longitudinally extending members and of the at least two structural members; and
the at least one buoyancy element is couplable to at least one of the longitudinally extending members and of the at least two structural members.

7. A water wave breaker assembly as claimed in claim 1, wherein the buoyant wave breaker element comprises an odd number of longitudinally extending members, wherein the longitudinally extending members comprise tubular members extending substantially parallel to one another along the buoyant wave breaker element.

8. A water wave breaker assembly comprising:
a buoyant wave breaker element including a plurality of longitudinally extending members spaced-apart from one another and defining an open cage structure; and
an anchor assembly connectable to the buoyant wave breaker element and allowing rotation of the buoyant wave breaker element when floating on a body of water;
wherein the anchor assembly comprises at least two flexible anchor links, each one of the flexible anchor links having a first end connected to a respective distal end of the buoyant wave breaker element and allowing rotation thereof and a second end attached to at least one stationary anchor in a configuration substantially preventing pivoting movements of the buoyant wave breaker element relatively to a direction of incoming waves, and wherein each one of the first ends are connected to a respective rotatable coupler unit connected to the buoyant wave breaker element.

9. A buoyant wave breaker element comprising:
a plurality of longitudinally extending members spaced-apart from one another and defining an open cage structure;
a plurality of transversal arms extending through the open cage structure and outwardly past the longitudinally extending members;
at least one structural member connected to the longitudinally extending members and configurating the longitudinally extending members in a spaced apart configuration to define the open cage structure through which a liquid can flow;
at least one ballast element couplable with at least one of the longitudinally extending members, the transversal arms, and the at least one structural member; and
at least one buoyancy element couplable to at least one of the longitudinally extending members, the transversal arms, and the at least one structural member.

10. A buoyant wave breaker element as claimed in claim 9, wherein the transversal arms extend in a substantially perpendicular configuration with respect to the longitudinally extending members.

11. A buoyant wave breaker element as claimed in claim 9, wherein the at least one structural member comprises:
at least two structural members and wherein two of the structural members connect respective distal ends of the longitudinally extending members; and
at least two rotatable coupler units, each one of the rotatable coupler units being connected to a respective one of the structural members connected to the distal ends of the longitudinally extending members and being connectable to an anchor assembly; and
wherein each one of the structural members connected to the distal ends of the longitudinally extending members has an aperture defined therein substantially aligned with a central longitudinal axis of the buoyant wave breaker element, the rotatable coupler units being rotatably inserted in a respective one of the apertures.

12. A buoyant wave breaker element as claimed in claim 9, wherein the buoyant wave breaker element is configured to rest substantially horizontally in a body of water when the longitudinally extending members are at least partially immerged below a water surface of the body of water.

13. A buoyant wave breaker element as claimed in claim 9, wherein the buoyant wave breaker element comprises at least two sets of the transversal arms and wherein each one of the sets comprises at least two of the transversal arms, and wherein the transversal arms of the sets have a criss-crossing center coinciding substantially with a central longitudinal axis of the buoyant wave breaker element.

14. A wave breaker assembly kit comprising:
a plurality of longitudinally extending members;
at least one structural member connectable to the longitudinally extending members and configurating the longitudinally extending members in a spaced apart configuration and defining therewith an open cage structure through which a liquid can flow;
a plurality of transversal arms insertable in the open cage structure in a non-parallel orientation with respect to the longitudinally extending members and extending outwardly past the longitudinally extending members when inserted in the open cage structure;
at least two structural members connectable to respective distal ends of the longitudinally extending members; and
at least two rotatable coupler units, each one of the rotatable coupler units being securable to a respective one of the structural members securable to the distal ends of the longitudinally extending members and being connectable to an anchor assembly;
wherein each one of the structural members securable to the distal ends of the longitudinally extending members has an aperture defined therein and the rotatable coupler units are rotatably insertable in a respective one of the apertures.

15. A wave breaker assembly kit as claimed in claim 14, further comprising:
at least one ballast element couplable with at least one of the longitudinally extending members, the transversal arms, and the at least one structural member; and
at least one buoyancy element couplable to at least one of the longitudinally extending members, the transversal arms, and the at least one structural member; and
wherein the transversal arms extend in a substantially perpendicular configuration with respect to the longitudinally extending members when inserted in the open cage structure.

16. A wave breaker assembly kit as claimed in claim 14, further comprising an anchor assembly connectable to the at least one structural member and allowing rotation of an assembly of the longitudinally extending members, the transversal arms, and the at least one structural member when floating on a body of water, wherein the anchor assembly further comprises at least one flexible anchor link having a first end connectable to the at least one structural member and allowing rotation thereof and a second end connectable to a stationary anchor.

17. A wave breaker assembly kit comprising:
a plurality of longitudinally extending members;
at least one structural member connectable to the longitudinally extending members and configuring the longitudinally extending members in a spaced apart configuration and defining therewith a buoyant wave breaker element with an open cage structure through which a liquid can flow when connected together;
at least one rotatable coupler unit securable to the at least one structural member; and
an anchor assembly connectable to the buoyant wave breaker element through the at least one rotatable coupler unit and allowing rotation of the buoyant wave breaker element when floating on a body of water;
wherein the anchor assembly comprises at least two flexible anchor links, each one of the flexible anchor links having a first end connectable to a respective distal end of the buoyant wave breaker element and allowing rotation thereof and a second end securable to at least one stationary anchor.

18. A wave breaker assembly kit as claimed in claim 17, further comprising:
a plurality of transversal arms insertable in the open cage structure in a non-parallel orientation with respect to the longitudinally extending members and extending outwardly past the longitudinally extending members when inserted in the open cage structure; and
at least one ballast element couplable with at least one of the longitudinally extending members, the transversal arms, and the at least one structural member.

19. A wave breaker assembly kit as claimed in claim 18, further comprising at least one buoyancy element couplable to at least one of the longitudinally extending members, the transversal arms, and the at least one structural member.

20. A wave breaker assembly kit as claimed in claim 18, wherein the at least one structural member comprises:
at least two structural members and wherein two of the structural members are connectable respective distal ends of the longitudinally extending members; and
at least two rotatable coupler units, each one of the rotatable coupler units being securable to a respective one of the structural members securable to the distal ends of the longitudinally extending members and being connectable to the anchor assembly; and
wherein each one of the structural members connectable to the distal ends of the longitudinally extending members has an aperture defined therein and the rotatable coupler units are rotatably insertable in a respective one of the apertures.

* * * * *